United States Patent [19]

Specht

[11] Patent Number: 4,677,040
[45] Date of Patent: Jun. 30, 1987

[54] POWER GENERATION SYSTEMS AND METHODS

[75] Inventor: Steven J. Specht, Mentor, Ohio

[73] Assignee: Gould Inc., Rolling Meadows, Ill.

[21] Appl. No.: 831,811

[22] Filed: Feb. 21, 1986

[51] Int. Cl.$^4$ ............................................. H01M 8/06
[52] U.S. Cl. ...................................... 429/14; 429/17; 429/19; 60/698
[58] Field of Search ........................ 429/14, 17, 27, 19, 429/13; 60/314, 316, 698

[56] References Cited

U.S. PATENT DOCUMENTS

| | | |
|---|---|---|
| 3,791,871 | 2/1974 | Rowley . |
| 3,976,509 | 8/1976 | Tsai et al. . |
| 4,084,038 | 4/1978 | Scragg et al. ........................ 429/19 |
| 4,349,613 | 9/1982 | Winsel .................... 429/17 |
| 4,528,248 | 7/1985 | Galbraith . |

FOREIGN PATENT DOCUMENTS 51-77831  7/1976  Japan .
56-39028  9/1981  Japan .

OTHER PUBLICATIONS

Momyer et al, Development of a Lithium–Water–Air Primary Battery, Conference: Energy to the 21st Century, Proceedings of the 15th Intersociety Energy Conversion Engineering Conference, Seattle, Wash., U.S.A., (18–22 Aug. 1980), pp. 1480–1486.
Cooper, J. F. et al, "Lithium Requirements for Electric Vehicles Using Lithium–Water–Air Batteries", Symposium on United States Lithium Resources—Requirements by the Year 2000, Nov. 12, 1975.

Primary Examiner—Donald L. Walton
Attorney, Agent, or Firm—Wood, Dalton, Phillips, Mason & Rowe

[57] ABSTRACT

A power generation system utilizing an electrochemical cell comprising a reactive metal anode, a cathode spaced from the anode, and an electrolyte comprising an aqueous solution of the hydroxide of the reactive metal is disclosed. Carbon is oxidized to form carbon dioxide which in turn is contacted with the electrolyte of the electrochemical cell to form a carbonate reaction product of the metal hydroxide and the carbon dioxide. The carbonate reaction product is separated from the electrolyte and the electrolyte is recirculated to the electrochemical cell. The carbon may be oxidized in a manner so as to generate useful power.

23 Claims, 2 Drawing Figures

POWER GENERATION SYSTEMS AND METHODS

BACKGROUND OF THE INVENTION

1. Field of the Invention

This invention relates generally to power generation systems and, more particularly, this invention relates to electrochemical cells and methods for improving performance therein.

2. Description of the Related Art

Electrochemical cells utilizing a reactive metal anode, a nonreactive, electrically conductive cathode and an aqueous electrolyte are well known. Such cells are described in detail in numerous patents and publications, including Rowley U.S. Pat. No. 3,791,871 (Feb. 12, 1974), Tsai et al U.S. Pat. No. 3,976,509 (Aug. 24, 1976), and Galbraith U.S. Pat. No. 4,528,248 (July 9, 1985), the respective disclosures of which are incorporated herein by reference.

The cell disclosed in Rowley U.S. Pat. No. 3,791,871 typifies prior electrochemical cells utilizing a reactive metal anode which is highly reactive with water and spaced from a cathode by an electrically insulating film formed on the anode in the presence of water. The anode and cathode are in contact with an aqueous electrolyte during cell operation. In the cell of the Rowley patent, the anode comprises an elemental alkali metal such as sodium or lithium, and the electrolyte comprises an aqueous solution of sodium hydroxide or lithium hydroxide, respectively, produced by the electrochemical reaction of the anodic metal with water.

The anode of the Rowley patent is coated with a thin film of a nonreactive, partially water soluble material which is not electrically conductive. Preferably, the film is the natural hydrated oxide which forms on the metal surface as it is exposed to humid air. However, other suitable water soluble insulators may serve as the film. The film is porous and allows transport of aqueous electrolyte to the anode and transport of reaction products away from the anode.

A cathode comprising a nonreactive, electrically conductive metal is spaced from the anode to define a reaction zone therebetween.

The electrolyte of the cell disclosed in the Rowley patent is formed by the electrochemical reaction of water and the anodic metal. Thus, in the Rowley cell, water is introduced to the cell at a restricted rate and brought into direct contact with both the cathode and anode. The water dissolves a portion of the soluble film on the anode, resulting in the production of a hydrated hydroxide of the anode material, plus heat. As the reaction proceeds, useful electrical power is produced.

The anode and the cathode are not in direct contact with each other, but circuit connections are made at each of the cathode and anode for drawing electrical power from the cell.

The alkali metal of the anode is highly reactive with water. This reactivity decreases as the concentration of metal hydroxide in the electrolyte increases.

The electrolyte is preferably a hydroxide of the alkali metal utilized as the anode since such hydroxide is naturally formed during operation of the cell and hence automatically regenerates the electrolyte during operation.

Optimally (at typical operating temperatures), the concentration of lithium hydroxide in the electrolyte is maintained at about 4.2–4.5 molar. As the lithium hydroxide concentration in the cell rises, the rate of power generation from the cell correspondingly diminishes, and passivation of the anode can occur if the electrolyte becomes saturated with lithium hydroxide.

Thus, in these electrochemical cells, relatively high reactive metal hydroxide concentrations must be avoided to maintain a desired level of power output at operating temperatures.

Therefore, steps must be taken to maintain the reactive metal hydroxide concentration in the electrolyte at a level at which useful electrical current is produced.

Electrolyte management, i.e., the removal of the reactive metal hydroxide from the circulated electrolyte, presents a significant burden to reactive metal/aqueous electrolyte electrochemical cells.

SUMMARY OF THE INVENTION

It is an object of the invention to overcome one or more of the problems described above.

According to the present invention, a power generating system comprises an electrochemical cell including a reactive metal anode, a cathode spaced from the anode to define a reaction zone therebetween, and an electrolyte comprising an aqueous solution of the hydroxide of the reactive anodic metal. In addition, the system includes a source of oxidizable carbon, such as coke, coal or liquid hydrocarbon fuel, and an oxidizing means, such as a burner or internal combustion engine. The oxidizable carbon is oxidized to form carbon dioxide.

In turn, the electrolyte of the electrochemical cell is contacted with the carbon dioxide. The carbon dioxide reacts with the metal hydroxide to form the less soluble carbonate reaction product of the metal hydroxide. The carbonate reaction product is then separated from the electrolyte, thus reducing the hydroxide concentration of the electrolyte. The resulting electrolyte is recirculated to the cell reaction zone for continuous and efficient cell operation.

In addition, the invention comprehends a power generating system wherein the oxidation of carbon generates useful power such as realized when the oxidizing means is an internal combustion engine, for example.

Also, the invention comprehends corresponding methods of power generation.

Other objects and advantages will be apparent to those skilled in the art in the following detailed description taken in conjunction with the drawings and the appended claims.

DETAILED DESCRIPTION OF THE INVENTION

Figure 1:
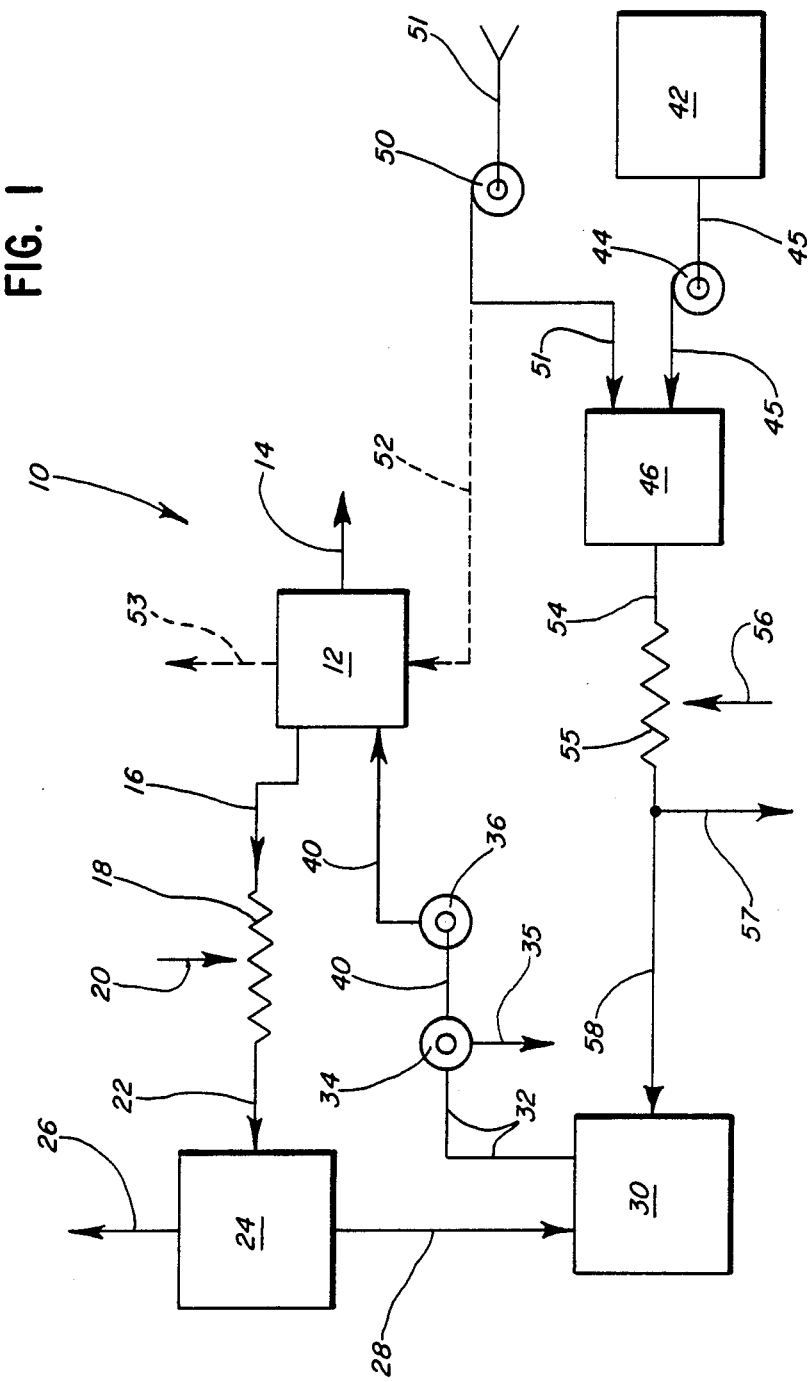
FIG. 1 is a schematic flow diagram of a system for electrolyte management according to a typical embodiment of the present invention.

According to the invention, a power generation system and a method of power generation and electrolyte management in aqueous/reactive metal electrochemical cells is provided. The invention contemplates a system for power generation having an electrochemical cell with a lithium or other reactive metal anode. The present invention may be used with any configuration of cell which operates to produce the hydroxide of the anodic metal in an aqueous electrolyte. The cell typically has a reactive metal anode, a cathode spaced from the anode to define a reaction zone therebetween, and an aqueous electrolyte (with or without additives).

Lithium is the preferred anodic material both because of its high energy density and because a carbonate reaction product thereof (i.e., lithium carbonate) rapidly forms in aqueous lithium hydroxide solution and is relatively insoluble therein, thereby freely precipitating out of solution and facilitating removal of the carbonate reaction product from the electrolyte. Other reactive metals, such as other alkali metals, for example, may be used. The metal of the anode may be present in elemental, compound, alloy, amalgam or mixture form, as desired. Reference herein to the preferred lithium is exemplary only, and the invention is understood to encompass the use of other reactive metals.

An electrochemical reaction occurs at the anode, as is well known, to produce a cation of the anodic metal, and an electron. The anodic cation reacts with the negatively charged ionic specie (typically hydroxide ion) in the electrolyte to form an anodic reaction product, typically lithium hydroxide (LiOH) in the case of a lithium anode.

As is well known in the art, alkali metal anodes are coated with a water soluble, metal ion permeable insulating coating of the hydrated hydroxide of the anodic metal. This coating naturally forms on the anode upon exposure of the anode to humid air and acts to modulate the electrochemical reaction.

The metal hydroxide coating on the anode typically effects spacing between the anode and cathode, which may be in physical contact, but not direct electrical contact, with each other. As is known in the art, however, other physical spacers, such as foam, screen, beads or combinations thereof, may be present.

The systems shown in the drawings include lithium anode-air cathode cells, but it is understood that the concept of the present invention is applicable to other battery configurations and chemistries as well.

Referring to FIG. 1, a system, generally designated 10, for electrolyte management is shown. The system 10 includes a cell stack 12 comprising a plurality of reactive metal anode electrochemical cells. The cell stack 12 generates an electrical power output 14 which can be used for work.

An electrolyte flow stream 16, containing dissolved lithium hydroxide with hydrogen gas dispersed therein, is circulated from the cell stack 12 through a heat exchanger 18. The hydrogen gas forms as a by-product of the parasitic/corrosion reaction which occurs in each cell of the stack 12. The heat exchanger 18 removes heat from the stream 16 by indirectly contacting the stream 16 with a cooling stream 20 of air or water passing through heat exchanger 18. Cooling the stream 16 facilitates handling of the electrolyte.

A cooled electrolyte flow stream 22 exits the heat exchanger 18 and is passed to an electrolyte reservoir/gas separator 24 wherein hydrogen gas, as well as other gases present in the electrolyte flow stream 22, are vented, as signified by the flow stream 26, resulting in an aqueous lithium hydroxide solution, depicted as a flow stream 28. The stream 28 is circulated from the reservoir/gas separator 24 to a gas/liquid contacter 30. The gas/liquid contacter 30 may take the form of a contact scrubber such as that shown in U.S. Pat. No. 4,528,249 to Galbraith.

In the contacter 30, lithium hydroxide in the stream 28 reacts with carbon dioxide to form lithium carbonate, as follows:

$$2LiOH + CO_2 \rightarrow Li_2CO_3 + H_2O$$

The lithium carbonate product has only limited solubility in water, and its solubility decreases with increasing temperature, thus facilitating its separation and removal. Furthermore, the lithium carbonate product is nontoxic.

A product stream 32 passes from the contacter 30 to a suitable liquid/solid separating means 34, such as a centrifuge or filter, for example, for the removal of solids, signified by a flow stream 35, including the carbonate reaction product. The lithium carbonate so removed can be ejected from the cell to remove unnecessary weight, or can be stored for later recovery of its lithium metal.

A circulation pump 36 circulates the electrolyte from the separator 34 via a stream 40 to the cell stack 12 permitting reuse of electrolyte.

The carbon dioxide used in the contacter 30 can be generated, as required, by combustion of carbon with air. For purposes of the description of this embodiment, it will be assumed that the carbon is in the form of a liquid hydrocarbon fuel (e.g. gasoline) stored in a storage tank 42. It is understood, however, that the carbon may be in an alternative form or state (e.g. coal, coke, etc.) without departing from the spirit of the invention.

Gasoline typically contains about 85% carbon and 15% hydrogen and upon combustion yields carbon dioxide and water. The water, produced as a by-product of the combustion of carbon, is in excess of the requirements of the electrochemical cell and may be vented or, in the alternative, used for humidification of the feed air to the air cathodes in the cell stack.

In FIG. 1, the fuel is transferred from a storage tank 42 by means of a pump 44 through a stream 45 to a burner 46. In the burner 46, the fuel is burned and the carbon therein is thus oxidized. The fuel so burned, because of its thermal energy content, can be used for environmental heating or producing steam to power turbines or turboelectric generators.

Air, in a stream 51, is supplied to an air compressor/blower 50. A flow stream 52 indicates the capability of the air compressor/blower 50 to supply air to both the burner 46 and to the cell stack 12. A flow stream 53 depicts the outflow of air from the cell stack 12.

An exhaust stream 54 from the burner 46 passes through a heat exchanger 55 which has a cooling stream 56 of air or water passing therethrough. The heat exchanger 55 condenses the water vapor formed as a result of combustion of the fuel. Water condensate flows from the heat exchanger 55 in a stream 57, and can be used for humidification of the feed air to the air cathode of the cell stack 12, as make-up water for the electrolyte or, alternatively, can be discharged.

A carbon dioxide gas flow stream 58 is then passed to the contacter 30 wherein the carbon dioxide reacts with lithium hydroxide to form lithium carbonate.

Figure 2:
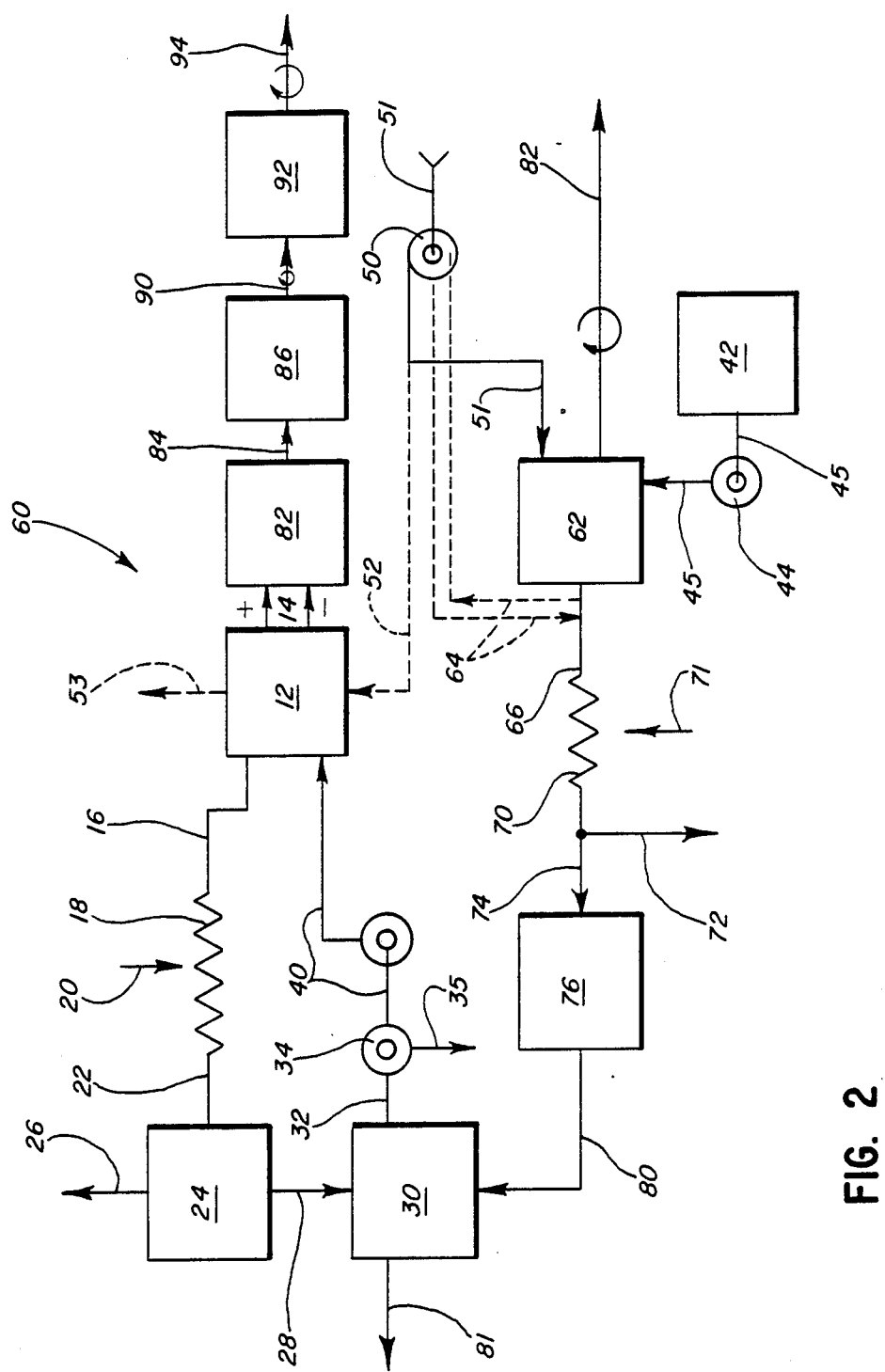
FIG. 2 is a schematic flow diagram of a system for electrolyte management according to a preferred embodiment of the present invention.

Referring now to FIG. 2, a preferred embodiment of the present invention is shown. A system, generally designated 60, similar to the system 10 of FIG. 1 is shown. The system 60 includes components such as a cell stack 12, an electrolyte reservoir/gas separator 24, a blower 50, pumps 36 and 44, a separator 34, a gas/liquid contacter 30, and associated connections. The system 60, however, includes an internal combustion engine 62 for the generation of carbon dioxide by the combustion of carbon in air. As in FIG. 1, the carbon itself can be carried as a solid or liquid and burned to produce carbon dioxide.

For purposes of the description of this embodiment, it will be again assumed that the carbon is in the form of a liquid hydrocarbon fuel, such as gasoline, which is stored in a storage tank 42.

The hydrocarbon fuel is fed to the internal combustion engine 62 wherein the fuel is exposed to air and an ignition spark, oxidizing the carbon of the fuel to produce work and the hydrogen of the fuel to produce water vapor. Air, shown as the flow stream 51, is supplied by an air compressor/blower 50 as in FIG. 1. A fraction of the exhaust gas 64 from the internal combustion engine 62 can be used to power the air compressor/blower 50 and thereafter returned to the remainder of the exhaust, depicted as a flow stream 66, so as to retain the carbon dioxide content of the stream 66 for electrolyte management and thus reduce the required fuel consumption of the engine.

The exhaust stream 66 passes through a heat exchanger 70 wherein, by indirectly contacting the stream 66 with a cooling stream 71 of air or water, heat is removed from the stream 66. Upon cooling, any water condensate, signified as a flow stream 72, is discharged or used to replace the water losses of the system. Thus, the water 72 may be used to compensate for evaporative losses from the air side of the air cathodes of the cell stack 12, i.e. to humidify the air feed stream 52, and water losses associated with separation of precipitates from the electrolyte. For example, filters and centrifuges typically remove 5 to 30 volume percent of liquid along with the solids being removed. The water so lost may be replenished from the water stream 72, permitting continuous operation of the system.

The remaining exhaust, depicted as a flow stream 74, is passed to a suitable means 76 for insuring complete combustion of a carbon to carbon dioxide, such as a catalytic converter, for example. The gases exiting from the converter 76, depicted by a flow stream 80, are then passed to the contacter 30.

In the contacter 30, nitrogen and other non-reactive gases, such as $NO_x$, $SO_2$, $CO$ and inert gases, present in the engine exhaust 74 are discharged, depicted as a flow stream 81.

The fuel burned in the internal combustion engine 62 is made to deliver useful work, i.e., a shaft power output 82. Engine power output 82 can be added to the fuel cell power output and the efficiency of the combined engine/fuel cell is higher than the efficiency of either system alone. The system 60, by using the engine 62 to convert the fuel to carbon dioxide and thereby removing some of the energy of combustion as shaft power rather than heat, requires a heat exchanger of reduced size, as compared to a system in which the energy of combustion solely generates heat.

In addition, the system 60 of FIG. 2 depicts the energy output 14 from the cell stack 12 as being fed to a current inverter 82. The inverter output 84, in turn, is fed to a motor 86 which in turn results in a shaft power output 90. Also, if desired, a speed reducer 92 may be used to reduce the speed of the shaft power output 90 to a shaft power output 94.

The system 60 shown in FIG. 2 provides carbon dioxide, useful as a precipitating agent for the removal of lithium hydroxide, as a by-product of a power generating source, e.g., an internal combustion engine. Thus, the hydrocarbon fuel generates useful power while it is being converted into carbon dioxide for use in the removal of lithium hydroxide.

Some of the benefits realizable from the practice of the invention have been calculated for a power generating system such as that shown in FIG. 2 and including a lithium anode/oxygen-consuming cathode fuel cell sized for shaft power output of about 44.2 kw. For such a cell, the carbon dioxide consumption rate is 24.48 kg/hr, which is the equivalent to a carbon consumption rate of 6.675 kg/hr. Since gasoline contains approximately 85% carbon, the amount of gasoline theoretically required is 17.27 lbs/hr. Typical piston engines have a specific fuel consumption of 0.55 lb of fuel per horsepower hour. Thus, the power output of an engine that would burn the required 17.27 lbs/hr of gasoline would be 23.4 kw. The power output for the total system would be 67.6 kw, i.e., 23.4 kw from the engine and 44.2 kw from the fuel cell.

The consumption of stored reactants (fuels) for the entire system is 15.64 kg/hr, i.e., 7.85 kg/hr of gasoline for the gasoline engine and 7.79 kg/hr of lithium for the lithium-air fuel cell.

The specific fuel consumption for the overall system would thus be 0.231 kg/kwh. For comparison, the specific fuel consumption for the gasoline engine alone would be 0.334 kg/kwh and for the lithium-air fuel cell system alone the specific fuel consumption would be 0.419 kg/kwh.

It is to be understood that various alternative oxidizing means which produce useful work can be used in the practice of the invention, for example, oxidation of carbon and/or hydrocarbon fuels to produce useful work can be accomplished through the use of electrochemical fuel cells.

The foregoing detailed description is given for clearness of understanding only, and no unnecessary limitation should be understood therefrom, as modifications within the scope of the invention will be obvious to those skilled in the art.

I claim:

1. A method of power generation comprising the steps of:
    supplying an electrolyte to an electrochemical reaction zone defined between a reactive metal anode and a spaced cathode of an electrochemical cell to produce a power output, said electrolyte comprising an aqueous solution of the hydroxide of said reactive metal;
    oxidizing carbon to form carbon dioxide and generate useful power;
    combining said useful power with the power output of said electrochemical cell to produce useful work;
    contacting said electrolyte with said carbon dioxide to form a carbonate reaction product of said metal hydroxide and said carbon dioxide;
    separating said carbonate reaction product from said electrolyte; and
    recirculating said separated electrolyte to said reaction zone.

2. The method of claim 1 wherein said carbon is oxidized in an electrochemical fuel cell.

3. The method of claim 1 wherein said carbon is oxidized in an internal combustion engine.

4. The method of claim 3 wherein said internal combustion engine is associated with means for assuring substantially complete oxidation of said carbon.

5. The method of claim 4 wherein said means for assuring substantially complete oxidation comprises a catalytic converter.

6. The method of claim 1 wherein said carbon is supplied in the form selected from the group consisting of coke, coal and liquid hydrocarbon fuel.

7. The method of claim 1 wherein said reactive metal comprises an alkali metal.

8. The method of claim 7 wherein said alkali metal comprises lithium.

9. The method of claim 1 wherein said step of separating said carbonate reaction product from said electrolyte comprises filtration.

10. The method of claim 1 wherein said step of separating said carbonate reaction product from said electrolyte comprises centrifugation.

11. A system for power generation comprising:
an electrochemical cell for producing a power output including a reactive metal anode, a cathode spaced from said anode, and an electrolyte comprising an aqueous solution of the hydroxide of said reactive metal;
a source of oxidizable carbon;
means for oxidizing said carbon to form carbon dioxide and generate useful power;
means for contacting said electrolyte with said carbon dioxide to form a carbonate reaction product of said metal hydroxide and said carbon dioxide;
means for separating said carbonate reaction product from said electrolyte;
means for recirculating said separated electrolyte to said electrochemical cell; and
means for combining the power output of said electrochemical cell with the power output of said oxidizing means to produce useful work.

12. The system of claim 11 wherein said oxidizing means comprises an electrochemical fuel cell.

13. The system of claim 11 wherein said oxidizing means comprises an internal combustion engine.

14. The system of claim 13 wherein said internal combustion engine is associated with means for obtaining substantially complete oxidation of said carbon.

15. The system of claim 14 wherein said means for obtaining substantially complete oxidation comprises a catalytic converter.

16. The system of claim 11 wherein said source of oxidizable carbon is selected from the group consisting of coke, coal and liquid hydrocarbon fuels.

17. The system of claim 11 wherein said reactive anode comprises an alkali metal.

18. The system of claim 17 wherein said alkali metal comprises lithium.

19. The system of claim 11 wherein said separating means comprises a filter.

20. The system of claim 11 wherein said separating means comprises a centrifuge.

21. The system of claim 11 wherein said electrochemical cell produces an energy output and said system additionally comprises a current inverter into which said energy output is fed.

22. The system of claim 21 additionally comprising a motor to which the output from said current inverter is fed.

23. The system of claim 22 additionally comprising a speed reducer to which the output from said motor is fed.

* * * * *